United States Patent [19]
Cordery et al.

[11] Patent Number: 6,064,989
[45] Date of Patent: May 16, 2000

[54] SYNCHRONIZATION OF CRYPTOGRAPHIC KEYS BETWEEN TWO MODULES OF A DISTRIBUTED SYSTEM

[75] Inventors: Robert A. Cordery, Danbury; Brad L. Davies, Trumbull; Louis J. Loglisci, Stamford; Edward J. Naclario, Madison; Maria P. Parkos, Southbury; Frederick W. Ryan, Jr., Oxford; Mark A. Scribe, Southbury; John H. Steinmetz, Bridgeport; Joel L. Wald, Stamford, all of Conn.

[73] Assignee: Pitney Bowes Inc., Stamford, Conn.

[21] Appl. No.: 08/864,929

[22] Filed: May 29, 1997

[51] Int. Cl.[7] .................................................. H04L 9/00
[52] U.S. Cl. ............................. 705/50; 705/60; 380/221
[58] Field of Search ................... 380/21, 1, 60, 380/50, 221; 705/1, 60, 50

[56] References Cited

U.S. PATENT DOCUMENTS

| | | | |
|---|---|---|---|
| 4,253,158 | 2/1981 | McFiggans | 705/60 |
| 4,725,718 | 2/1988 | Sansone et al. | 235/495 |
| 4,743,747 | 5/1988 | Fougere et al. | 235/494 |
| 4,757,537 | 7/1988 | Edelmann et al. | 705/60 |
| 4,775,246 | 10/1988 | Edelmann et al. | 705/62 |
| 4,813,912 | 3/1989 | Chickness et al. | 705/408 |
| 4,831,555 | 5/1989 | Sansone et al. | 358/1.14 |
| 4,853,865 | 8/1989 | Sansone et al. | 705/403 |
| 4,853,961 | 8/1989 | Pastor | 713/176 |
| 4,912,762 | 3/1990 | Lee et al. | 380/24 |
| 4,935,961 | 6/1990 | Gargiulo et al. | 380/260 |
| 4,949,381 | 8/1990 | Pastor | 380/51 |
| 5,111,504 | 5/1992 | Esserman et al. | 380/51 |
| 5,142,577 | 8/1992 | Pastor | 705/62 |
| 5,181,245 | 1/1993 | Jones et al. | 705/61 |
| 5,583,779 | 12/1996 | Naclerio et al. | 705/408 |
| 5,606,613 | 2/1997 | Lee et al. | 380/21 |
| 5,666,421 | 9/1997 | Pastor et al. | 380/51 |
| 5,680,456 | 10/1997 | Baker et al. | 380/21 |
| 5,684,949 | 11/1997 | Naclerio | 713/200 |
| 5,687,237 | 11/1997 | Naclerio | 380/29 |

OTHER PUBLICATIONS

Applied Cryptography, Author Bruce Schneier.

*Primary Examiner*—Emanuel Todd Voeltz
*Assistant Examiner*—Thomas A. Dixon
*Attorney, Agent, or Firm*—Angelo N. Chaclas; Michael E. Melton

[57] ABSTRACT

The apparatus comprises: a first module including a universal key; a second module including a unique identifier and a unique key wherein the unique key is derived from the unique identifier and the universal key and incorporated into the second module during manufacture of the second module. The second module is in communication with the first module. The apparatus further comprises a controller for performing the following subsequent to manufacture of the first module and the second module: initiating a communication session between the first module and the second module; transmitting the unique identifier from the second module to the first module; and deriving the unique key in the first module using the unique identifier and the universal key. A method for synchronization of cryptographic keys between modules of a distributed system and a method of manufacturing a postage evidencing system are also provided.

11 Claims, 5 Drawing Sheets

| DOMAIN | ENABLE | KEY |
|---|---|---|
| 1 | 0 | $K_{phm}1$ |
| 2 | 0 | $K_{phm}2$ |
| 3 | 0 | $K_{phm}3$ |
| 4 | 0 | $K_{phm}4$ |
| 5 | 0 | $K_{phm}5$ |
| 6 | 0 | $K_{phm}6$ |
| 7 | 0 | $K_{phm}7$ |
| 8 | 0 | $K_{phm}8$ |
| 9 | 0 | $K_{phm}9$ |
| 10 | 0 | $K_{phm}10$ |
| 11 | 0 | $K_{phm}11$ |
| 12 | 0 | $K_{phm}12$ |
| 13 | 0 | $K_{phm}13$ |
| TEST | 1 | $K_{phm}test$ |

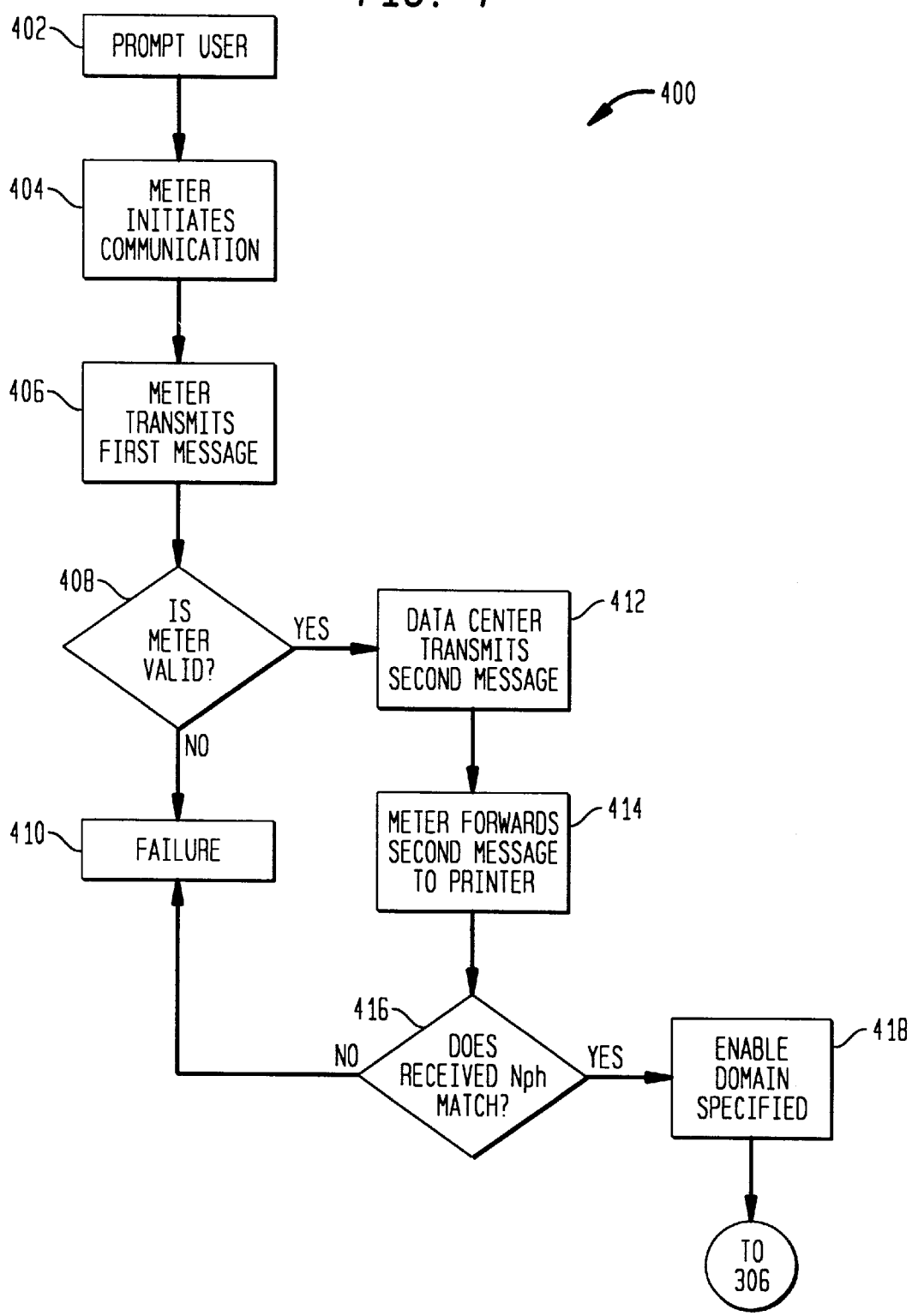

SYNCHRONIZATION OF CRYPTOGRAPHIC KEYS BETWEEN TWO MODULES OF A DISTRIBUTED SYSTEM

CROSS REFERENCE TO RELATED APPLICATIONS

This application is related to copending U.S. patent application Ser. No. 08/864928, filed concurrently herewith, and entitled UPDATING DOMAINS IN A POSTAGE EVIDENCING SYSTEM (E-616).

FIELD OF THE INVENTION

This invention relates to value dispensing systems. More particularly, this invention is directed to a postage evidencing system comprising a mailing machine base, a secure accounting meter detachably mounted to the base and a printer also detachably mounted to the base wherein the meter and the printer are manufactured to be interchangeable while still providing for secure mutual authentication.

BACKGROUND OF THE INVENTION

One example of a value printing system is a postage evidencing system including an electronic postage meter and a printer for printing a postal indicia on an envelope or other mailpiece. Electronic postage meters for dispensing postage and accounting for the amount of postage used are well known in the art. The meter supplies evidence of the postage dispensed by printing indicia which indicates the value of the postage on an envelope or the like. The typical postage meter stores accounting information concerning its usage in a variety of registers. An ascending register tracks the total amount of postage dispensed by the meter over its lifetime. That is, the ascending register is incremented by the amount of postage dispensed after each transaction. A descending register tracks the amount of postage available for use. Thus, the descending register is decremented by the amount of postage dispensed after each transaction. When the descending register has been decremented to some value insufficient for dispensing postage, then the postage meter inhibits further printing of indicia until the descending register is resupplied with funds.

Traditionally, the postage meter and the printer have been located within a single secure housing. Examples of this type of postage evidencing system are the PostPerfec™ and Personal Post Office™ available from Pitney Bowes, Inc. of Stamford, Connecticut, USA. In this environment, the communications between the postage meter and the printer may be either secure or nonsecure. However, recently efforts have been undertaken to provide a postage meter and a printer which are physically separated from each other. Thus, in this type of postage evidencing system, the postage meter and the printer are no longer contained within the same secure housing and the communication lines between the postage meter and the printer are generally nonsecure.

Using nonsecure communication lines between the postage meter and the printer creates a risk of loss of postal funds through fraud. For example, when data necessary to print a valid postal indicia is transferred over the nonsecure communication lines from the postage meter to the printer, it is susceptible to interception, capture and analysis. If this occurs, then the data may be retransmitted at a latter time back to the printer in an attempt to fool the printer into believing that it is communicating with a valid postage meter. If successful, the result would be a fraudulent postage indicia printed on a mailpiece without the postage meter accounting for the value of the postage indicia.

Generally, it is known to employ secret cryptographic keys in postage evidencing systems to prevent such fraudulent practices. This is accomplished by having the postage meter and the printer authenticate each other prior to any printing taking place. One such system is described in U.S. patent application Ser. No. 08/579,507, filed on Dec. 27, 1995, and entitled METHOD AND APPARATUS FOR SECURELY AUTHORIZING PERFORMANCE OF A FUNCTION IN A DISTRIBUTED SYSTEM SUCH AS A POSTAGE METER (E-476). In summary, this application provides a postage evidencing system including a meter and a printer each having an identical set of authentication keys stored in their respective memories. On a random basis, the printer and the meter in secret fashion coordinate the selection of which authentication key will be used to perform mutual authentication. Importantly, if a valid mutual authentication is to be obtained, it is necessary that the same key is selected for use by the meter and the printer.

Although this system generally works well, it suffers from certain disadvantages and drawbacks. For example, the set of authentication keys are the same for every postage evidencing system. That is, the set of authentication keys are universal in that they will operate with any postage evidencing system. Thus, if one postage evidencing system is compromised, then the other postage evidencing systems are also compromised.

To address this problem, other prior art postage evidencing systems have proposed a different system which provides a unique set of authentication keys for each postage meter and printer combination. In this arrangement, if one postage evidencing system is compromised, then the other postage evidencing systems are not compromised. However, the postage meter and the printer are dedicated to each other because each particular postage meter is tied to only one printer, and vice versa. Thus, interchangeability of components, such as using the same postage meter with a plurality of different printers or replacing a defective printer in the postage evidencing system, is difficult due to the necessity of reconfiguring the meter and the printer to each other. This would require updating of the authentication key sets which would increase costs and operating expenses.

Therefore, there is a need for a postage evidencing system that reduces the exposure of universal keys and allows for the interchangeability of postage meters with printers.

SUMMARY OF THE INVENTION

Accordingly, it is an object of the present invention to provide a postage evidencing system with improved security and interchangeability which substantially overcomes the problems associated with the prior art.

In accomplishing this and other objects there is provided an apparatus for synchronizing cryptographic keys. The apparatus comprises: a first module including a universal key; a second module including a unique identifier and a unique key wherein the unique key is derived from the unique identifier and the universal key and incorporated into the second module during manufacture of the second module. The second module is in communication with the first module. The apparatus further comprises a controller for performing the following subsequent to manufacture of the first module and the second module: initiating a communication session between the first module and the second module; transmitting the unique identifier from the second module to the first module; and deriving the unique key in the first module using the unique identifier and the universal key.

In accomplishing this and other objects there is provided a method for synchronizing cryptographic keys between a first module and a second module, the second module in communication with the first module, the method comprising the step(s) of: storing a universal key in the first module; storing a unique identifier in the second module; storing a unique key in the second module during manufacture of the second module wherein the unique key is derived from the unique identifier and the universal key; initiating a communication session between the first module and the second module subsequent to manufacture of the first module and the second module; transmitting the unique identifier from the second module to the first module; and deriving the unique key in the first module using the unique identifier and the universal key so that the unique key exists in both the first module and the second module.

Additionally, there is provided a method of manufacturing a postage evidencing system including a meter, a printer and a control means for synchronizing cryptographic keys between the meter and the printer.

Therefore, it should now be apparent that the invention substantially achieves all the above objects and advantages. Additional objects and advantages of the invention will be set forth in the description which follows, and in part will be obvious from the description, or may be learned by practice of the invention. Moreover, the objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown through out the drawings, like reference numerals designate like or corresponding parts.

FIG. 4 is a flow chart showing a routine to add a domain to the printer in the field in accordance with the present invention.

DETAILED DESCRIPTION OF THE PREFERRED EMBODIMENTS

Figure 1:
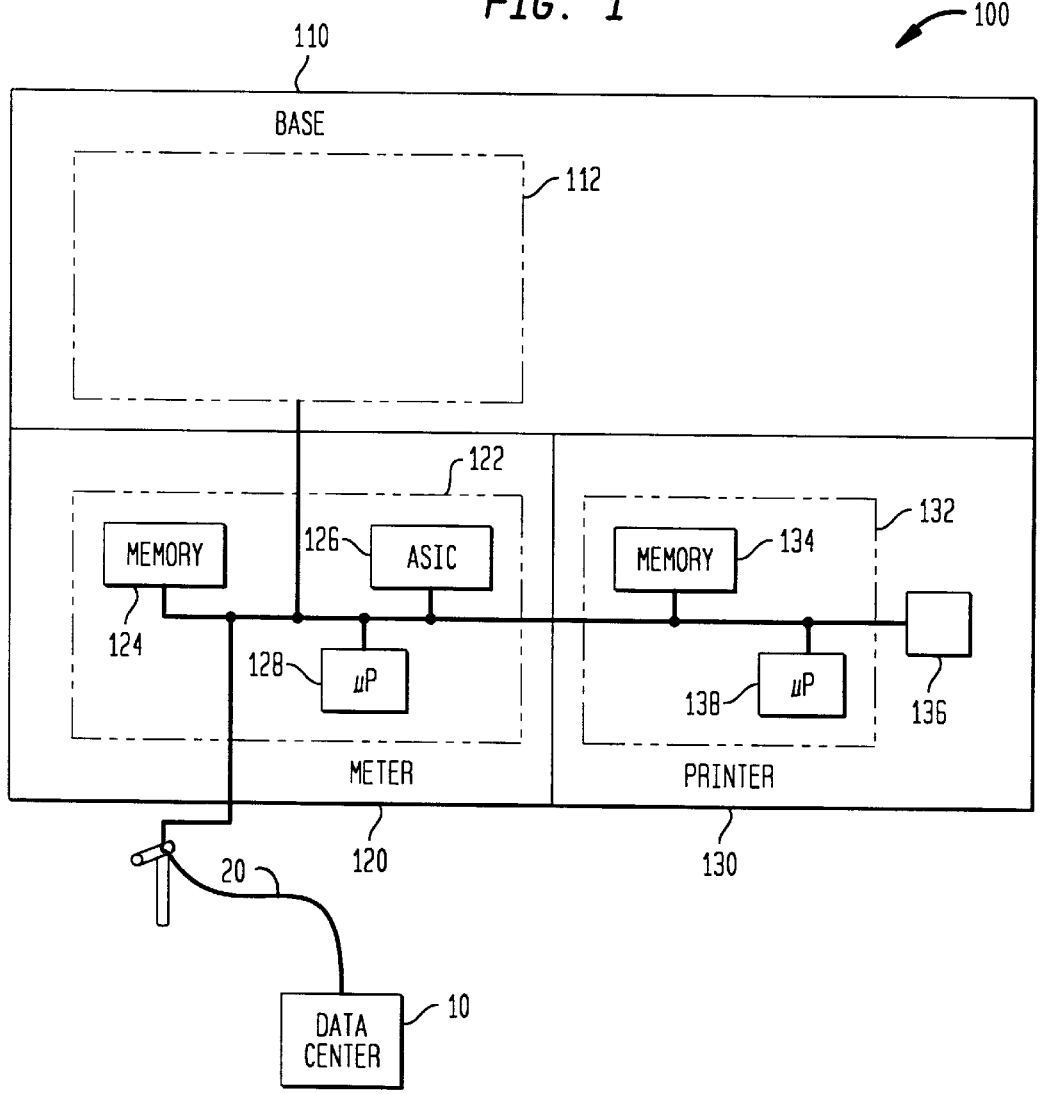
FIG. 1 is a schematic representation of a postage evidencing system including a postage meter and a printer in accordance with the present invention.

Referring to FIG. 1, a postage evidencing system 100 in accordance with a first embodiment of the invention is shown. The postage evidencing system 100 includes a mailing machine base 110, a postage meter 120 and a printer 130.

The mailing machine base 110 includes a variety of different modules (not shown) where each module performs a different task on a mailpiece (not shown), such as: singulating (separating the mailpieces one at a time from a stack of mailpieces), weighing, moistening/sealing (wetting and closing the glued flap of an envelope) and transporting the mailpiece through the modules. However, the exact configuration of each mailing machine is particular to the needs of the user. Additionally, the mailing machine base 110 includes an interface (not shown) of any conventional design, such as an LCD display and keypad, for communicating information to the user and receiving inputs from the user. The mailing machine base 110 further includes a controller 112 which oversees the operation of all the modules of the mailing machine base 110. Since a detailed description of the mailing machine base 100 is not necessary for an understanding of the present invention, its description will be limited for the sake of conciseness.

The postage meter 120 is detachably mounted to the mailing machine base 110 by any conventional structure (not shown) and includes a controller 122 having a memory 124, a security application specific integrated circuit (ASIC) 126 having suitable memory and logic (not shown) and a microprocessor 128. The controller 122 is in operative communication with the controller 112 of the mailing machine base 110 over suitable communication lines. Additionally, the controller 122 of the postage meter 120 is in operative communication with a remote data center 10 over suitable communication lines, such as a telephone line 20. The data center 10 communicates with the postage meter 120 for the purposes of remote inspection of accounting registers (not shown), downloading of postal funds and other purposes described in more detail below.

The printer 130 is also detachably mounted to the mailing machine base 110 by any conventional structure (not shown) and includes a print mechanism 136 and controller 132 having a memory 134 and a microprocessor 138. Alternatively, the memory 134 could be located within the microprocessor 138. The controller 132 is in operative communication with the controller 122 of the postage meter 120 and the print mechanism 136 over suitable communication lines. The print mechanism 136 prints a postal indicia (not shown) on the mailpiece (not shown) in response to instructions from the postage meter 120 which accounts for the value of the postage dispensed in conventional fashion. The print mechanism 136 may be of any suitable design, such as: rotary drum, flat impression die, thermal transfer, ink jet, xerographic or the like.

To provide for security of postal funds and to prevent fraud, the postage meter 120 and the printer 130 are provided with secret cryptographic keys which are necessary for mutual authentication. Stored within the memory 124, preferably of the non-volatile type, of the postage meter 120 is a print head/meter universal key $K_{phm}x$. To limit exposure of the universal key $K_{phm}x$ to being compromised, the world is geographically split into multiple domains each with its own separate universal key $K_{phm}x$. In the preferred embodiment, the world is divided into thirteen (13) domains. Thus, a unique universal key $K_{phm}x$ exists for each domain. For example, a unique universal key $K_{phm}1$ is provided for domain #1, a unique universal key $K_{phm}2$ is provided for domain #2, and so on. However, only one universal key $K_{phm}x$ is provided in each postage meter 120 depending upon the domain in which the postage meter 120 is authorized for use by the local postal authority. Therefore, if the first domain universal key $K_{phm}1$ is compromised, then postage meters 120 in domain #2 through domain #13 will not be compromised. Additionally, a test domain used for diagnostics and manufacturing testing is also provided having a unique universal key $K_{phm}$test.

For added security, the universal key $K_{phm}x$ is stored in memory 124 in encrypted form using an embedded security key $K_{es}$. Thus, the meter 120 must decrypt the universal key $K_{phm}x$ prior to use. In the preferred embodiment, the embedded security key $K_{es}$ is only utilized for decrypting the universal key $K_{phm}x$ and is therefore distinct from the other keys used with the postage evidencing system 100. A more detailed description of this procedure is provided below.

Figure 2:
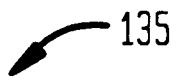
FIG. 2 is a table showing a complete set of printer specific keys, one for every domain, which have been loaded into a memory of the printer during manufacture in accordance with the present invention.

In similar fashion, the printer 130 is also provided with secret cryptographic keys which are necessary for mutual authentication. Referring to FIGS. 1 and 2, stored within the memory 134 of the printer 130 is a table 135, as shown in FIG. 2, that contains a complete set of printer specific keys $K_{ph}x$, one for every domain, which have been loaded into the printer 130 during manufacture. Thus, the set of keys $K_{ph}x$ includes $K_{ph}1$ through $K_{ph}13$ and $K_{ph}$test which correspond to the geographic domains discussed above with respect to the postage meter 120. Also stored within the memory 134 of the printer 130 is a serial number $N_{ph}$ which is a unique number for every printer 130. The set of keys $K_{ph}x$ are derived during manufacture by encrypting the serial number $N_{ph}$ using the universal keys $K_{phm}x$ according to the following equation:

$$K_{ph}x = DES(N_{ph}; K_{phm}x) \quad (1)$$

where DES represents a Data Encryption Standard encryption engine, the serial number $N_{ph}$ represents the message to be encrypted and the key $K_{phm}x$ represents the cryptographic key used to perform the encryption. Thus, a unique set of printer keys $K_{ph}x$ exists for each printer 130 which correspond to the geographic domains. For example, the key $K_{ph}1$ is unique for the printer 130 and is provided for domain #1 by deriving it from equation (1) through appropriate substitution: $K_{ph}1 = DES(N_{ph}; K_{phm}1)$. The remaining keys $K_{ph}x$ are derived in similar fashion.

By providing the printer 130 with the set of printer keys $K_{ph}x$, one for every domain, it should be appreciated that the printer 130 as manufactured has the capability to operate in any domain. This is achieved by shipping the printer 130 with only the test domain enabled, as indicated in the table of FIG. 2, and then synchronizing the printer 130 with a postage meter 120 located within a particular domain in the field. This is in contrast to the meter 120 which is only provided with one universal key $K_{phm}x$ depending upon the domain where the postage meter 120 is authorized for use by a governing postal authority.

The mailing machine base controller 112, the postage meter controller 122 and the printer controller 132 all work cooperatively to execute a plurality of routines, described in detail below, in accordance with the present invention. Thus, they contain suitable software and hardware to accomplish those functions described in the routines. With respect to some functions, it is a matter of design choice where they can be implemented. With respect to other functions, it is important they be implemented in a particular controller 112,122 or 132. This will be evident to those skilled in the art from the detailed descriptions below.

Figure 3:
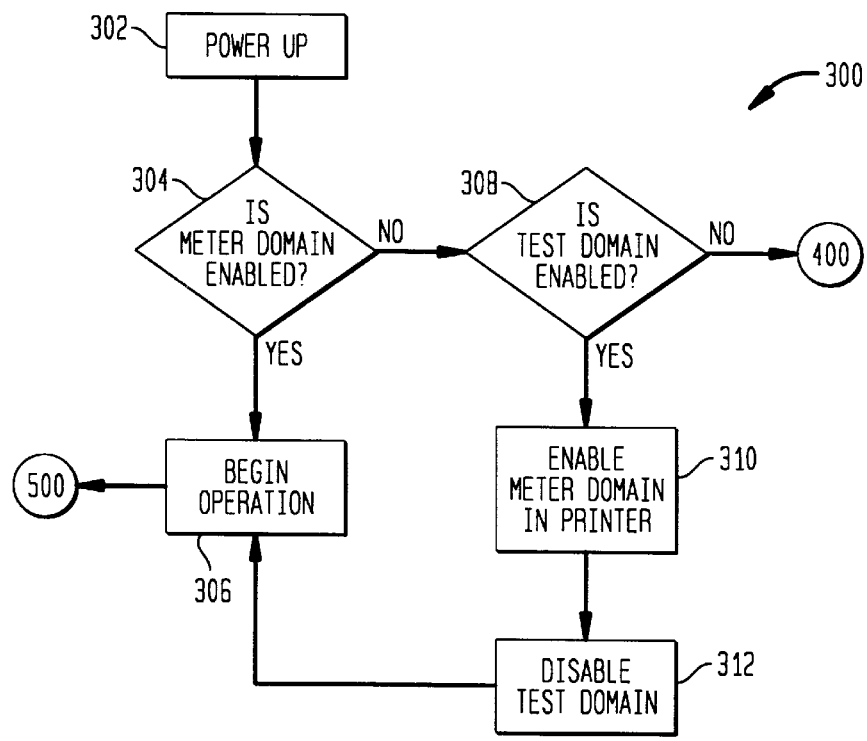
FIG. 3 is a flow chart showing a routine to synchronize the printer with the postage meter in the field in accordance with the present invention.

To synchronize the printer 130 with the postage meter 120 in the field, the postage evidencing system 100 executes a routine 300 as shown in FIG. 3. Referring primarily to FIG. 3 while referencing the structure of FIG. 1, at 302, the postage meter 120 and the printer 130 are powered up and each performs self diagnostics to ensure that normal operating conditions exist. At 304, a determination is made whether the domain of the meter 120 has been enabled in the printer 130. If yes, then at 306 the postage evidencing system 100 begins normal operations and proceeds to execute a key synchronization routine 500 to ensure that the meter 120 is communicating with a valid printer 130 and that the printer 130 is communication with a valid meter 120 prior to printing any postal indicia. However, if at 304 the answer is no, then at 308 a determination is made whether the test domain of the printer 130 is enabled. If yes, then at 310, the domain in the printer 130 which corresponds to the domain of the meter 120 is enabled. Then, at 312 the test domain is permanently disabled before proceeding to normal operations at 306. However, if at 308 the answer is no, then an add domain routine 400 is executed.

Figure 5:
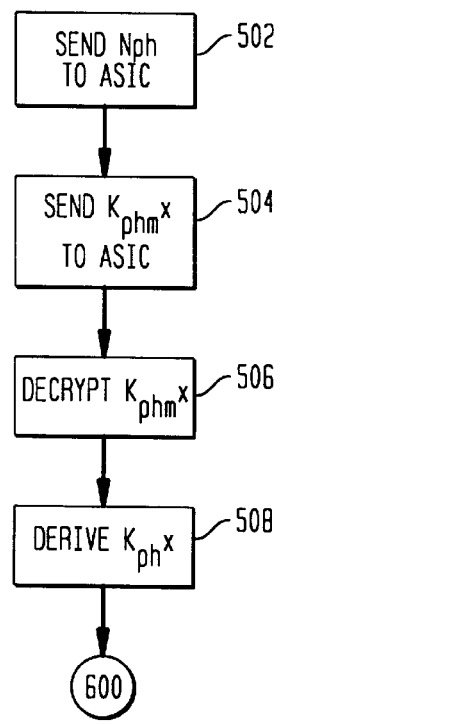
FIG. 5 is a flow chart showing a routine to derive a key necessary to synchronize the printer with the postage meter in the field in accordance with the present invention.

Referring primarily to FIG. 5 while referencing the structure of FIG. 1, a description of the key synchronization routine 500 will now be provided. At 502, the serial number $N_{ph}$ of the printer 130 is sent to the security ASIC 126. Next, at 504 the encrypted universal key $K_{phm}x$ is brought from the memory 124 to the security ASIC 126. Next, at 506 the encrypted universal key $K_{phm}x$ is decrypted using the security key $K_{es}$ which is embedded within the security ASIC 126. Thus, the security key $K_{es}$ is masked within the hardware of the security ASIC 126 and generally not discernible to the outside world. Next, at 508 key $K_{ph}x$ is derived within the security ASIC 126 using equation (1). It should now be apparent to those skilled in the art that keys have been synchronized between the meter 120 and the printer 130 without transmitting the keys themselves. Furthermore, the keys used are unique to that meter 120 and printer 130 combination only. That is, since the serial number $N_{ph}$ of the printer 130 is unique to each printer 130 in the preferred embodiment so as to provide the greatest degree of security, no two keys $K_{ph}x$ are the same. In summary, the meter 130 has the capability to make a key $K_{ph}x$ which is specific to the particular printer 130 with which it is in communication. Therefore, the interchangeability of the meters 120 with the printers 130 is provided for. Once the keys have been synchronized, the postage evidencing system 100 then proceeds to execute a mutual session authentication routine 600.

It should now be apparent to those skilled in the art that the present invention provides for secure communications and interchangeability between the postage meter 120 and the printer 130. For example, if the printer 130 becomes defective and needs to be replaced in the field, then a new printer 130 could be shipped and installed by a service person without regard to the domain that the new printer 130 is being shipped into or the particular meter 120 that the new printer 130 will be interfaced to. This is because upon the first communication between the meter 120 and the printer 130, the meter 120 will derive the appropriate key $K_{ph}x$ which is particular to the new printer 130 and enable the appropriate domain in the new printer 130. As another example, if a new meter 120 is installed for use with the existing printer 130, then the new meter will also derive the appropriate key $K_{ph}x$ which is particular to the existing printer 130 just as the replaced meter 120 had done.

In the preferred embodiment, it is desirable not to allow the meter 120 to change the domain which is enabled within the printer 130 other than at the time when the printer 130 is first placed into service and the domain is changed from the test domain as described above in the routine 300 in FIG. 3. Therefore, the postage evidencing system 100 must communicate securely with the remote data center 10 to obtain authorization to enable an additional domain within the printer 130. In this manner, an added level of security is achieved. Otherwise, the exposure to fraud if a universal key $K_{phm}x$ were to become compromised would be far greater. For example, if the meter 120 were permitted to change the domain of the printer 130, then a compromised universal key for domain #1 $K_{phm}1$ would lead to a greater amount of fraud. This is because the compromised universal key for domain #1 $K_{phm}1$ could be loaded into other meters 120 located outside of domain #1. Then these other meters 120, in addition to those located in domain #1, would also be able to print fraudulent postal indicias if the other meters 120 had the capability to change the domain of their associated printer 130. Therefore, the risk of fraud would greatly increase. Moreover, the manufacturer would be compelled not only to recall those printers 130 located in domain #1, but also in every other domain. This would prove to be administratively complex and costly.

Base on the above factors, the meter 120 is not allowed to change the domain of the printer 130 once the printer 130 has been initialized for the first time. Referring primarily to FIG. 4 while referencing the structure of FIG. 1, a description of the add domain routine 400 will now be provided. At 402, the user is prompted by the mailing machine base 110 to initiate communication with the data center 10 for the purpose of adding a domain to the printer 130. Next, at 404, the meter 120 initiates communication with the data center 10 via telephone line 20. Next, at 406, the meter 120 obtains the serial number $N_{ph}$ from the printer 130 and assembles a first message which includes the serial number $N_{ph}$, a meter serial number $N_m$ which is a unique number for each meter 120 and the domain number. This first message is transmitted to the data center 10 by the meter 120. Next, at 408, the data center 10 makes a determination whether the meter 120 is valid. This involves: (i) looking up in a database to see if the meter serial number $N_m$ which has been received has been placed into service and is active; and (ii) comparing the domain number in the database associated with the meter serial number $N_m$ with the domain number which has been received to see if they match. To be valid, the meter 120 must survive both inquiries. If at 408 the answer is no, then at 410 a failure occurs and the user is instructed to contact the data center 10 before power resetting the postage evidencing device 100. On the other hand, if at 408 that answer is yes, then at 412 the data center transmits a second message to the meter 120 which includes the serial number $N_{ph}$ and the domain number. This second message is encrypted using a remote communications key $K_d$ stored in the data center 10. In the preferred embodiment, the remote communications key $K_d$ is only utilized for remote communications and is therefore distinct from the other keys used with the postage evidencing system 100. That is, there is no overlap between the remote communications key $K_d$, the security key $K_{es}$, the universal keys $K_{phm}x$ and the printer keys $K_{ph}x$. At 414, the meter 120 forwards the second message to the printer 130. Next, at 416, the printer 130 decrypts the second message using the same key $K_d$ stored in the memory 134 of the printer 130 and makes a determination whether the received serial number $N_{ph}$ matches the actual serial number $N_{ph}$ of the printer 130. If no, then the routine 400 proceeds to 410 where a failure results. If yes, then at 418 the domain corresponding to the received domain number is enabled. Next, the routine 400 proceeds to 306 and operation continues accordingly. In the preferred embodiment, domains are never disabled (except for the test domain). Thus, the domain that is enabled according to the routine 400 is in addition to any other domains which have been previously enabled. Thus, the table 135 as shown in FIG. 2 will be updated accordingly with an "Enable" in the second column indicating that the domain is enabled and a "Disable" indicating those domains that are not enabled.

Figure 6:
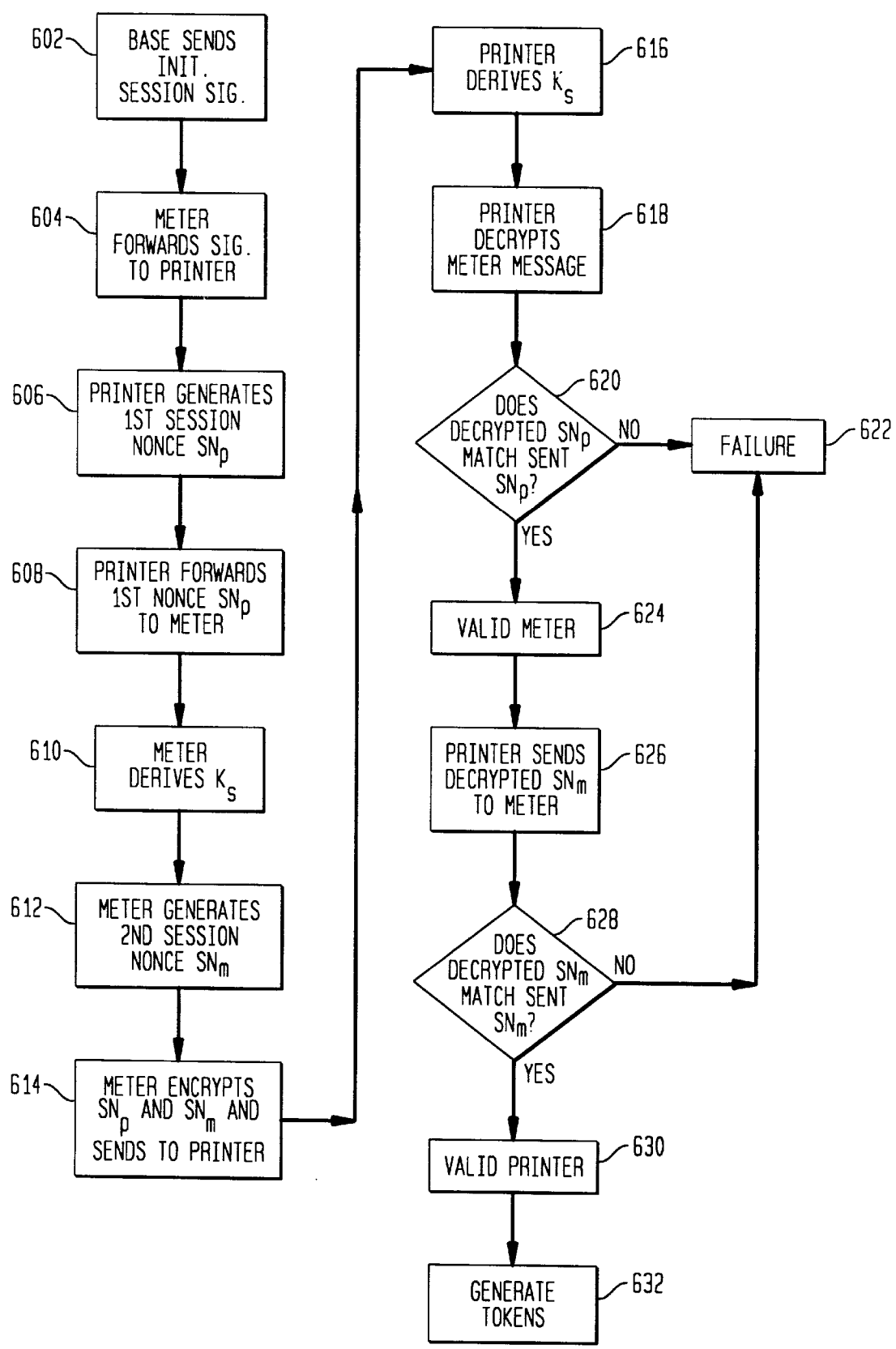
FIG. 6 is a flow chart showing a routine to mutually authenticate a communication session between the printer and the postage meter prior to printing postal indicia in accordance with the present invention.

Referring primarily to FIG. 6 while referencing the structure of FIG. 1, a description of the mutual session authentication routine 600 will now be provided. To ensure that postal funds are appropriately accounted for and that fraudulent postal indicias are not produced, the postage meter 120 and the printer 130 initiate the mutual authentication routine 600 prior to any printing taking place. At 602, the controller 112 of the mailing machine base 110 sends an initialize session signal to the meter 120 in response to the occurrence of one of a plurality of predetermined events, such as: the start of a batch run of envelopes or after a predetermined number (for example, 200) of envelopes within the batch run. Next, at 604 the meter forwards the initialize session signal to the printer 130. Next, at 606 the printer 130 generates a first session nonce $SN_p$ which is a random number generated in software in the printer controller 132. Next, at 608 the printer 130 sends the first session nonce $SN_p$ to the meter 120. Next, at 610 the meter 120 derives a session key $K_s$ according to the equation:

$$K_S = DES(SN_p; K_{ph}x) \qquad (2)$$

where DES represents the Data Encryption Standard encryption engine, the first session nonce $SN_p$ represents the message to be encrypted using the key $K_{ph}x$ which is the synchronized key obtained as described above. Next, at 612 the meter 120 generates a second session nonce $SN_m$ which is a random number generated in the meter controller 122. Next, at 614 the meter encrypts the first session nonce $SN_p$ and the second session nonce $SN_m$ using the key Ks and sends the resulting message to the printer 130. Next, at 616 the printer 130 derives the session key $K_s$ independently from the meter 120 using equation (2). Next, at 618 the printer 130 decrypts the encrypted message sent from the meter 120 using the key Ks. Next, at 620 the printer 130 makes a determination whether the decrypted first session nonce $SN_p$ that was received and the first session nonce $SN_p$ that was sent match. If no, then at 622 a failure results and printing is disabled and the user is instructed to power reset the postage evidencing system 100. If yes, then at 624 the printer concludes that the meter 120 is valid. Next, at 626 the printer 130 sends the decrypted second session nonce $SN_m$ to the meter 120. Next, at 628 the meter 120 makes a determination whether the decrypted second session nonce $SN_m$ that was received and the second session nonce $SN_m$ that was sent match. If no, then the routine proceeds to 622 indicating a failure has occurred. If yes, then at 630 the meter 120 concludes that the printer 130 is valid. Next, since the meter 120 and the printer 130 have successfully authenticated each other, at 632 the postage evidencing system 100 is to print a postal indicia and account for the postage dispensed. Generally, this is accomplished in a conventional manner by generating a secure token in the meter 120 which contains information necessary to print the postal indicia and communicating that token to the printer 130. Since this procedure is not necessary for an understanding of the present invention, no further description will be provided.

Those skilled in the art will now appreciate that since the set of printer keys $K_{ph}x$ are unique to each printer 130 and each respective domain, a high degree of security is maintained. For example, if key $K_{ph}1$ is compromised for a particular printer 130, then the security breach is confined to that particular printer 130 in the domain in which it is operating. Thus, the printers 130 and the postage meters 120 operating in the same domain and in other domains are not compromised.

Many features of the preferred embodiment represent design choices selected to best exploit the inventive concept as implemented in a postage evidencing device. However, those skilled in the art will recognize that various modifications can be made without departing from the spirit of the present invention. For example, the domains could be partitioned in a number of different manners, such as: by customer, by country, by customer and by country or any other predetermined segmentation that makes sense given the particular application. As another example, the placement of the universal key could be in the printer while the specific or unique keys were in the meter. In other words, a reversal of the operating relationship described above. As still another example, another encryption engine other than DES, such as RSA, could be substituted.

As yet another example, those skilled in the art will recognize that the mailing machine base controller 112, the meter controller 122 and the printer controller 132 can be of any conventional design incorporating appropriate hardware and software.

Therefore, the inventive concept in its broader aspects is not limited to the specific details of the preferred embodiment but is defined by the appended claims and their equivalents.

What is claimed is:

1. An apparatus for synchronizing cryptographic keys, the apparatus comprising:
   a first module including a universal key;
   a second module having stored therein a unique identifier and a unique key and wherein the unique key is derived from the unique identifier and the universal key and incorporated into the second module during manufacture of the second module, the second module being in communication with the first module; and
   control means for performing the following subsequent to manufacture of the first module and the second module:
      initiating a communication session between the first module and the second module;
      transmitting the unique identifier from the second module to the first module; and
      deriving the unique key in the first module using the unique identifier and the universal key so that the unique key exists in both the first module and the second module; and
      wherein:
   the universal key is one of a plurality of universal keys where each universal key is associated with a respective one of a plurality of domains of first modules, the first module is associated with a predetermined one of the plurality of domains;
   the unique key is one of a plurality of unique keys each of which are stored within the second module, the plurality of unique keys correspond to the plurality of domains, respectively; and
   the first module selects for use in subsequent communication the unique key in the second module that corresponds to the predetermined one of the plurality of domains.

2. The apparatus of claim 1, wherein:
   the first module includes a memory and a security circuit having an embedded security key therein, the embedded security key is distinct from the universal key and the unique key;
   the universal key is stored within the first module memory in encrypted form using the embedded security key;
   the universal key in encrypted form is decrypted in the security circuit using the embedded security key;
   the unique identifier is brought within the security circuit; and
   the unique key is derived in the security circuit.

3. The apparatus of claim 2, wherein:
   the first module is a postage meter;
   the second module is a printer; and
   the unique key is derived prior to printing a postal indicia.

4. A method of synchronizing cryptographic keys between a first module and a second module, the second module in communication with the first module, the method comprising the step(s) of:
   providing a plurality of domains of first modules;
   storing a universal key in the first module;
   storing a unique identifier in the second module;
   storing a unique key in the second module wherein the unique key is derived from the unique identifier and the universal key;
   associating the universal key with a predetermined one of the plurality of domains and wherein the unique key is one of a plurality of unique keys, each of which are stored within the second module, corresponding to the plurality of domains, respectively;
   initiating a communication session between the first module and the second module subsequent to manufacture of the meter and the printer;
   selecting, for use in subsequent communication with the first module, the unique key in the second module corresponding to the predetermined one of the plurality of domains;
   transmitting the unique identifier from the second module to the first module; and
   deriving the unique key in the first module using the unique identifier and the universal key so that the unique key exists in both the first module and the second module.

5. The method of claim 4, further comprising the step(s) of:
   providing the first module with a memory and a security circuit having an embedded security key therein, the embedded security key is distinct from the universal key and the unique key;
   storing the universal key within the first module memory in encrypted form using the embedded security key;
   decrypting the universal key in the security circuit using the embedded security key;
   bringing the unique identifier within the security circuit; and
   deriving the unique key in the security circuit.

6. The apparatus of claim 5, wherein:
   the first module is a postage meter; and
   the second module is a printer; and
   further comprising the step(s) of:
      deriving the unique key prior to printing a postal indicia.

7. A method of manufacturing a postage evidencing system including a meter and a printer, comprising the step(s) of:
   establishing a plurality of domains of meters;
   storing a universal key in the meter;
   storing a unique identifier in the printer;
   storing a unique key in the printer wherein the unique key is derived from the unique identifier and the universal key; and associating the universal key stored in the meter with a predetermined one of the plurality of domains;

storing a plurality of unique keys corresponding to the plurality of domains, respectively, in the printer wherein the unique key is one of the plurality of unique keys; and providing a control means capable of:

initiating a communication session between the meter and the printer subsequent to manufacture of the meter and the printer;

selecting, for use in subsequent communication with the meter, the unique key in the printer corresponding to the predetermined one of the plurality of domains;

transmitting the unique identifier from the printer to the meter; and deriving the unique key in the meter using the unique identifier and the universal key so that the unique key exists in both the meter and the printer.

8. The method of claim 7, further comprising the step(s) of:

providing the meter with a memory and a security circuit having an embedded security key therein, the embedded security key is distinct from the universal key and the unique key;

storing the universal key within the meter memory in encrypted form using the embedded security key;

decrypting the universal key in the security circuit using the embedded security key;

bringing the unique identifier within the security circuit; and deriving the unique key in the security circuit.

9. The apparatus of claim 8, further comprising the step(s) of:

providing the control means with capability to derive the unique key prior to printing a postal indicia.

10. An apparatus for synchronizing cryptographic keys, the apparatus comprising:

a first module including a universal key, the universal key being one of a plurality of universal keys where each universal key is associated with a respective one of a plurality of domains of first modules, the first module being associated with a predetermined one of the plurality of domains;

a second module having stored therein a plurality of communication keys each of which are derived from the universal key and are associated with a respective one of the plurality of domains of first modules, the second module being in communication with the first module; and a control system for performing the following:

initiating a communication session between the first module and the second module;

selecting a particular communication key from the plurality of communication keys stored within the second module that corresponds to the predetermined one of the plurality of domains;

deriving the communication key in the first module so that the communication key exists in both the first module and the second module; and using the communication key to convey messages between the first module and the second module.

11. A method of synchronizing cryptographic keys between a first module and a second module, the second module in communication with the first module, the method comprising the step(s) of:

initiating a communication session between the first module and the second module where the first module includes a universal key that is one of a plurality of universal keys where each universal key is associated with a respective one of a plurality of domains of first modules and the first module is associated with a predetermined one of the plurality of domains;

selecting a particular communication key from a plurality of communication keys stored within the second module where the plurality of communication keys, each of which are derived from the universal key, are associated with a respective one of the plurality of domains of first modules and the particular communication key corresponds to the predetermined one of the plurality of domains;

deriving the communication key in the first module so that the communication key exists in both the first module and the second module; and using the communication key to convey messages between the first module and the second module.

* * * * *